US008524828B2

(12) United States Patent
Davio et al.

(10) Patent No.: US 8,524,828 B2
(45) Date of Patent: Sep. 3, 2013

(54) POLYMERIC COMPOSITIONS

(75) Inventors: Delphine Davio, Le Roeulx (BE); Andreas Stammer, Pont-A-Celles (BE)

(73) Assignee: Dow Corning Corporation, Midland, MI (US)

( * ) Notice: Subject to any disclaimer, the term of this patent is extended or adjusted under 35 U.S.C. 154(b) by 155 days.

(21) Appl. No.: 12/937,695

(22) PCT Filed: Apr. 8, 2009

(86) PCT No.: PCT/EP2009/054257
§ 371 (c)(1),
(2), (4) Date: Mar. 25, 2011

(87) PCT Pub. No.: WO2009/127582
PCT Pub. Date: Oct. 22, 2009

(65) Prior Publication Data
US 2011/0198779 A1    Aug. 18, 2011

(30) Foreign Application Priority Data

Apr. 16, 2008   (GB) .................................. 0806820.7

(51) Int. Cl.
*C08L 83/04*   (2006.01)

(52) U.S. Cl.
USPC ........................................................ 524/588

(58) Field of Classification Search
USPC ........................................................ 524/588
See application file for complete search history.

(56) References Cited

U.S. PATENT DOCUMENTS

| | | | |
|---|---|---|---|
| 3,419,593 A | 12/1968 | Willing | |
| 3,445,420 A | 5/1969 | Kookootsedes et al. | |
| 3,715,334 A | 2/1973 | Karstedt | |
| 3,814,730 A | 6/1974 | Karstedt | |
| 3,923,705 A | 12/1975 | Smith | |
| 3,989,667 A | 11/1976 | Lee et al. | |
| 5,175,325 A | 12/1992 | Brown et al. | |
| 5,605,955 A | 2/1997 | Hirai | |
| 6,013,711 A | 1/2000 | Lewis et al. | |
| 6,362,288 B1 | 3/2002 | Brewer et al. | |
| 2004/0214965 A1* | 10/2004 | Tachikawa et al. | 525/477 |
| 2008/0171830 A1 | 7/2008 | Centner et al. | |

FOREIGN PATENT DOCUMENTS

| | | |
|---|---|---|
| CN | 100999601 A | 7/2007 |
| DE | 3342027 C1 | 5/1985 |
| DE | 3342026 A1 | 7/1985 |
| EP | 0210442 A2 | 2/1987 |
| EP | 0215215 A2 | 3/1987 |
| EP | 0802233 A2 | 10/1997 |
| EP | 1254192 B1 | 11/2002 |
| GB | 2424898 A | 10/2006 |
| JP | H11-71460 A | 3/1999 |
| JP | 2001-207002 A | 7/2001 |
| JP | 2003-277561 A | 10/2003 |
| JP | 2003-292407 A | 10/2003 |
| JP | 2004-504468 A | 2/2004 |
| JP | 2005-320407 A | 11/2005 |
| JP | 2006-137821 A | 6/2006 |
| WO | WO 01-49774 A2 | 7/2001 |
| WO | WO 2006-117362 A1 | 11/2006 |

OTHER PUBLICATIONS

English language abstract for CN 100999601 extracted from espacenet.com database Mar. 29, 2011, 8 pages.
English language abstract for DE 3342026 extracted from espacenet.com database Mar. 29, 2011, 26 pages.
English language abstract for DE 3342027 extracted from espacenet.com database Mar. 29, 2011, 9 pages.
English language translation and abstract for JP 2001-207002 extracted from PAJ database dated Mar. 29, 2011, 47 pages.
English language translation and abstract for JP 2003-277561 extracted from PAJ database dated Mar. 29, 2011, 31 pages.
English language translation and abstract for JP 2003-292407 extracted from PAJ database dated Mar. 29, 2011, 37 pages.
English language translation and abstract for JP 2005-320407 extracted from PAJ database dated Mar. 29, 2011, 36 pages.
PCT International Search Report for PCT/EP2009/054257 dated Dec. 2, 2009, 3 pages.
English language abstract for JP H11-71460 extracted from the espacenet.com database on Jun. 27, 2013, 19 pages.
English language abstract not available for JP 2004-504468; however, see English language equivalent US 6,362,288. Original Document extracted from the espacenet.com database on Jun. 27, 2013, 34 pages.
English language abstract and machine-assisted English translation for JP 2006-137821 extracted from the PAJ database on Jun. 27, 2013, 110 pages.
English language abstract for WO 2006-117362 extracted from the espacenet.com database on Jun. 26, 2013, 28 pages.

* cited by examiner

*Primary Examiner* — Kuo-Liang Peng
(74) *Attorney, Agent, or Firm* — Howard & Howard Attorneys PLLC

(57) ABSTRACT

A one or two part organopolysiloxane composition capable of cure to an elastomeric body, the composition comprising a polymer having a polymer backbone selected from an organopolysiloxane backbone and a telechelic backbone, which polymer has not less than two reactable silicon-bonded groups selected from alkenyl group, condensable groups, silyl-hydride groups, 5 to 50% by weight of the composition of an extender; a suitable cure catalyst; and optionally a siloxane and/or silane cross-linker having at least two groups per molecule which are reactable with the reactable groups in (a) and/or one or more fillers. The extender is selected from an alicyclic ester having at least two ester groups, and a boiling point of at least 180° C. or a mixture thereof having a boiling point range commencing at 180° C. or above; each ester group being the same or different and comprising from 2 to 30 carbon atoms.

16 Claims, No Drawings

POLYMERIC COMPOSITIONS

RELATED APPLICATIONS

This application claims priority to and all the advantages of International Patent Application No. PCT/EP2009/054257, filed on Apr. 8, 2009, which claims priority to Great Britain Patent Application No. GB0806820.7, filed on Apr. 16, 2008.

This invention is concerned with the use of extenders in organosiloxane based compositions and other silicon containing polymeric materials including those useful as sealing materials and elastomers.

Organosiloxane compositions which cure to elastomeric solids are well known and such compositions can be produced to cure at either room temperature in the presence of moisture or with application of heat. Typically those compositions which cure at room temperature in the presence of moisture are obtained by mixing a polydiorganosiloxane based polymer having reactive terminal groups, with a suitable silane (or siloxane) based cross-linking agent in the presence of one or more fillers and a curing catalyst. These compositions are typically either prepared in the form of one-part compositions curable upon exposure to atmospheric moisture at room temperature or two part compositions curable upon mixing at room temperature and pressure.

One important application of the above-described room temperature curable compositions is their use as sealants. In use as a sealant, it is important that the composition has a blend of properties which render it capable of being applied as a paste to a joint between substrate surfaces where it can be worked, prior to curing, to provide a smooth surfaced mass which will remain in its allotted position until it has cured into an elastomeric body adherent to the adjacent substrate surfaces. Typically sealant compositions are designed to cure quickly enough to provide a sound seal within several hours but at a speed enabling the applied material to be tooled into a desired configuration shortly after application. The resulting cured sealant is generally formulated to have a strength and elasticity appropriate for the particular joint concerned.

It has become common practice in the formulation of silicone based compositions used as room temperature cure sealants, to include additives which serve to "extend" and/or "plasticise" the silicone sealant composition by blending the or each extending compound (henceforth referred to as an "extender") with a pre-prepared polymer and other ingredients of the composition.

An extender (sometimes also referred to as a process aid or secondary plasticiser) is used to dilute the sealant composition and basically make the sealant more economically competitive without substantially negatively affecting the properties of the sealant formulation. The introduction of one or more extenders into a silicone sealant composition not only reduces the overall cost of the product but can also affect the properties of resulting uncured and/or cured silicone sealants. The addition of extenders can, to a degree, positively effect the rheology, adhesion and tooling properties and clarity of a silicone sealant and can cause an increase in elongation at break and a reduction in hardness of the cured product both of which can significantly enhance the lifetime of the cured sealant provided the extender is not lost from the cured sealant by, for example, evaporation or exudation. Organic extenders may, in some instances, also reduce staining of substrates in contact with the silicone elastomer in comparison to formulations containing silicone oil plasticizers.

Extenders need to be both sufficiently compatible with the remainder of the composition and as non-volatile as possible at the temperature at which the resulting cured elastomeric solid is to be maintained (e.g. room temperature). However it has been found that whilst some proposed extenders are effective during storage, at the time of application of the sealant and at least for a time thereafter, there are several well known problems regarding their use. These include:

(i) Poor compatibility with the polymer composition (e.g. a sealant composition) leading to their exuding from the sealant over time which negatively effects the physical and aesthetic properties and lifetime of the cured product e.g. sealant; and (ii) Staining of the surrounding substrates onto which the extenders exude from the composition.

The Compatibility of organic extenders with other ingredients in an organopolysiloxane based polymer composition, is a significantly greater problem than with respect to their use in organic based polymer compositions. This is particularly due to the fact that the silicone polymers into which the extenders are introduced tend to be highly viscous, and due to the relatively incompatible chemical nature of the compounds concerned. Silicone polymers are generally substantially non-polar in nature and as such many compounds used as plasticisers for polar organic based polymers such as, for example, PVC (polyvinylchloride) are unsuitable for use as extenders in silicone compositions due to their polar nature. For example some of the more commonly used phthalates used to plasticise PVC. The level of compatibility between polymer and extender effectively determines the amount of extender which can be introduced into the polymer composition. Typically this results in the introduction of significantly lower amounts of extenders into a composition than may be desired because the extender will not physically mix into the polymer composition sufficiently well.

CN100999601 describes a poly vinyl chloride composition which suggests the use in the composition of 2-diisononyl dicarboxylate as a possible plasticiser. JP2001-207002 proposes the use of 1,2-cyclohexane dicarboxylic acid diesters as plasticisers for vinyl chloride based resin compositions. JP 2003-277561 describes a chlorine containing paste resin comprising cyclohexene based dicarboxylic acid diesters as plasticisers. It will be noted that in each of these cases the polymer used is polar in nature (unlike the siloxanes of the present invention) and therefore teach the suitability of the plasticisers as suitable only in polar polymer compositions. Such a polar nature enables compatibility of the polymer and the plasticiser but this suggests that such plasticisers would not be compatible with non-polar polymer compositions such as siloxane compositions.

A wide variety of organic compounds and compositions have been proposed for use as extenders in silicone compositions and these are thoroughly reviewed in GB 2424898. DE3342026 and DE3342027 describe the use of esters of aliphatic monocarboxylic acids as extenders. DE3342027 describes one component dihydroxypolydimethylsiloxane based compositions comprising carboxylic acid esters that are liquid at room temperature. The esters are made of saturated linear aliphatic monocarboxylic acids having between 3 and 22 carbon atoms and monohydric alcohols with between 1 and 18 carbon atoms and/or dihydric or trihydric alcohols with between 2 and 18 carbon atoms which esters have a molecular weight of between 115 and 400 and a boiling point of at least 120° C. DE3342026 describes a process for preparing compositions such as the above in which a preformed siloxane polymer is blended with the plasticiser before the introduction of the other ingredients.

The applicants have now identified a new family of compounds which may be used as organic extenders for siloxane formulations. Surprisingly, it has been found that contrary to expectations, because of their polar nature, these plasticisers are compatible with siloxane based compositions.

In accordance with the present invention there is provided a one or two part organopolysiloxane composition capable of cure to an elastomeric body, the composition comprising
a) A polymer having a polymer backbone selected from an organopolysiloxane backbone and a telechelic backbone, which polymer has not less than two reactable silicon-bonded groups selected from alkenyl groups, condensable groups and silyl-hydride groups
b) If required, a siloxane and/or silane cross-linker having at least two groups per molecule which are reactable with the reactable groups in (a);
c) 5 to 50% by weight of the composition of an extender;
d) a suitable cure catalyst; and optionally
e) one or more fillers;
characterised in that the extender is selected from an alicyclic ester having at least two ester groups, and a boiling point of at least 180° C. or a mixture thereof having a boiling point range commencing at 180° C. or above; each ester group being the same or different and comprising from 2 to 30 carbon atoms.

The concept of "comprising" where used herein is used in its widest sense to mean and to encompass the notions of "include" and "consist of. Furthermore, henceforth all viscosities are measured at 25° C. unless otherwise indicated. For the sake of clarification it is to be understood that an alicyclic compound is an aliphatic organic compound having one or more ring structures each of which is non-aromatic (e.g. cyclohexane).

The condensable groups referred to in (a) are groups, preferably end groups, that will, in appropriate conditions, undergo a condensation reaction. Preferably the condensable groups in the present invention are hydroxyl containing terminal groups or hydrolysable end groups, in which case the composition in accordance with the present invention may be a one or two part organopolysiloxane sealant composition. In the case of a two part composition the composition is retained in two parts until immediately before use. Such a two part composition preferably comprises in the first part polymer (a) and filler (e) (when required) and in the second part catalyst (d) and cross-linker (b) are provided for mixing in an appropriate ratio (e.g. from 10:1 to 1:1) immediately prior to use. Additional additives to be discussed below may be provided in either the first or second part of the two part composition.

In one embodiment of the present invention the polymer component (a) used in the present invention is a polysiloxane containing polymer containing at least two condensable groups, most preferably the condensable groups are terminal hydroxyl or hydrolysable groups. Preferably the polymer has the general formula $$X^1\text{-}A\text{-}X^2 \qquad (1)$$

where $X^1$ and $X^2$ are independently selected from silicon containing groups which contain hydroxyl or hydrolysable substituents and A is selected from an organopolysiloxane or telechelic backbone. The organopolysiloxane backbone may contain a polymeric or copolymeric molecular chain or a siloxane/organic copolymeric molecular chain.

Examples of $X^1$ or $X^2$ groups incorporating hydroxyl and/or hydrolysable substituents include groups terminating as described below:
—Si(OH)$_3$, —(R$^a$)Si(OH)$_2$, —(R$^a$)$_2$SiOH, —R$^a$Si(OR$^b$)$_2$, —Si(OR$^b$)$_3$, —R$^a{}_2$SiOR$^b$ or —R$^a{}_2$Si—R$^c$—SiR$^d{}_p$(OR)$_{3-p}$
where each R$^a$ independently represents a monovalent hydrocarbyl group, for example, an alkyl group, in particular having from 1 to 8 carbon atoms, (and is preferably methyl); each R$^b$ and R$^d$ group is independently an alkyl or alkoxy group in which the alkyl groups suitably have up to 6 carbon atoms; R$^c$ is a divalent hydrocarbon group which may be interrupted by one or more siloxane spacers having up to six silicon atoms; and p has the value 0, 1 or 2.

Alternatively $X^1$ and $X^2$ may both comprise a group which will undergo an addition type reaction with a suitable cross-linking molecule. Preferably the addition type reaction is a hydrosilylation reaction and $X^2$ and $X^1$ both contain either a silicon-hydrogen bond or unsaturated organic substituents containing from 2 to 6 carbon atoms such as alkenyl groups, alkynyl groups, acrylate groups and/or alkylacrylate groups. However, alkenyl groups are preferred. Representative, non-limiting examples of the alkenyl groups are shown by the following structures; H$_2$C═CH—, H$_2$C═CHCH$_2$—, H$_2$C═C(CH$_3$)CH$_2$—, H$_2$C═CHCH$_2$CH$_2$—, H$_2$C═CHCH$_2$CH$_2$CH$_2$—, and H$_2$C═CHCH$_2$CH$_2$CH$_2$CH$_2$—. Representative, non-limiting examples of alkynyl groups are shown by the following structures; HC≡C—, HC≡CCH$_2$—, HC≡CC(CH$_3$)—, HC≡CC(CH$_3$)$_2$—, HC≡CC(CH$_3$)$_2$CH$_2$—.

Most preferably in this embodiment $X^1$ and $X^2$ are both alkenyl containing groups with vinyl containing groups being particularly preferred. A small proportion (<20%) of $X^1$ groups may comprise trialkylsilyl groups, in which each alkyl group is preferably methyl or ethyl.

Examples of suitable organopolysiloxane groups A in formula (1) are those which comprise a polydiorganosiloxane chain. Thus group A preferably includes siloxane units of formula (2)

$$—(R^5{}_aSiO_{(4-s)/2})— \qquad (2)$$

in which each $R^5$ is independently an organic group such as a hydrocarbon group having from 1 to 18 carbon atoms, a substituted hydrocarbon group having from 1 to 18 carbon atoms or a hydrocarbonoxy group having up to 18 carbon atoms and s has, on average, a value of from 1 to 3, preferably 1.8 to 2.2.

For the purpose of this application "Substituted" in the case of hydrocarbon groups means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Preferably $R^5$ is a hydrocarbyl group having from 1 to 10 carbon atoms optionally substituted with one or more halogen group such as chlorine or fluorine and s is 0, 1 or 2. Particular examples of groups $R^5$ include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Suitably, at least some and preferably substantially all of the groups $R^5$ are methyl.

Group A in the compound of formula (1) may include any suitable siloxane or siloxane/organic molecular chain providing the resulting polymer with a viscosity (in the absence of diluents, such as the extender) of up to 20 000 000 mPa·s, at 25° C. (i.e. up to or even more than 200 000 units of formula (2)).

The polydiorganosiloxanes comprising units of structure (2) may be homopolymers or copolymers. Mixtures of different polydiorganosiloxanes are also suitable.

In the case of polydiorganosiloxane co-polymers the polymeric chain may comprise a combination of blocks made from chains of units depicted in figure (2) above where the two $R^5$ groups are:
- both alkyl groups (preferably both methyl or ethyl), or
- alkyl and phenyl groups, or
- alkyl and fluoropropyl, or
- alkyl and vinyl or
- alkyl and hydrogen groups.

Typically at least one block will comprise siloxane units in which both $R^5$ groups are alkyl groups.

In one preferred embodiment A is a linear organopolysiloxane molecular chain (i.e. s=2) for all chain units. Preferred materials have polydiorganosiloxane chains comprising units according to the general formula (3)

$$—(R^5{}_2SiO)_t— \qquad (3)$$

in which each $R^5$ is as defined above and is preferably a methyl group and t has a value of up to or even more than 200 000. Suitable polymers have viscosities of up to 20 000 000 mPa·s at 25° C.

Whilst preferably A (in formula 1) is an organopolysiloxane molecular chain, A may alternatively be a block copolymeric backbone comprising at least one block of siloxane groups of the type depicted in formula (2) above and an organic component comprising any suitable organic based polymer backbone for example the organic polymer backbone may comprise, for example, polystyrene and/or substituted polystyrenes such as poly(α-methylstyrene), poly(vinylmethylstyrene), dienes, poly(p-trimethylsilylstyrene) and poly(p-trimethylsilyl-α-methylstyrene). Other organic components which may be incorporated in the polymeric backbone may include acetylene terminated oligophenylenes, vinylbenzyl terminated aromatic polysulphones oligomers, aromatic polyesters, aromatic polyester based monomers, polyalkylenes, polyurethanes, aliphatic polyesters, aliphatic polyamides and aromatic polyamides and the like.

However perhaps the most preferred organic based polymeric blocks in A are polyoxyalkylene based blocks, which typically bond with siloxanes via a hydrosilylation reaction prior to introduction of the chain extender of the present invention. Such polyoxyalkylene blocks preferably comprise a linear predominantly oxyalkylene polymer comprised of recurring oxyalkylene units, $(—C_nH_{2n}—O—)$ illustrated by the average formula $(—C_nH_{2n}—O—)_y$ wherein n is an integer from 2 to 4 inclusive and y is an integer of at least four. The number average molecular weight of each polyoxyalkylene polymer block may range from about 300 to about 10,000. Moreover, the oxyalkylene units are not necessarily identical throughout the polyoxyalkylene monomer, but can differ from unit to unit. A polyoxyalkylene block, for example, can be comprised of oxyethylene units, $(—C_2H_4—O—)$; oxypropylene units $(—C_3H_6—O—)$; or oxybutylene units, $(—C_4H_8—O—)$; or mixtures thereof. Preferably the polyoxyalkylene polymeric backbone consists essentially of oxyethylene units and/or oxypropylene units.

Other polyoxyalkylene blocks may include for example: units of the structure—

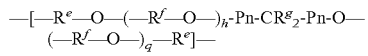

in which Pn is a 1,4-phenylene group, each $R^e$ is the same or different and is a divalent hydrocarbon group having 2 to 8 carbon atoms, each $R^f$ is the same or different and, is, an ethylene group propylene group, or isopropylene group each $R^g$ is the same or different and is a hydrogen atom or methyl group and each of the subscripts h and q is a positive integer in the range from 3 to 30.

In the case where the polymer of the present invention is a telechelic polymer the polymer has an organic backbone having terminal curable silyl groups. The silyl groups may be selected from any of those terminal groups referred to above with respect to the organopolysiloxane polymer e.g. they may be dialkoxyalkylsilyl or trialkoxysilyl groups can for example be derived from a dialkoxyalkylsilylpropyl methacrylate or trialkoxysilylpropyl methacrylate. When the acrylate polymer has been prepared by a polymerisation process which forms reactive terminal groups, such as atom transfer radical polymerization, chain transfer polymerization, or living anionic polymerisation, it can readily be reacted with the silyl-substituted alkyl acrylate or methacrylate monomer.

When the polymer of the present invention is a telechelic polymer it may contain grafted, pendant or copolymerised curable silyl groups. For example a silyl-substituted alkyl acrylate or methacrylate monomer can be copolymerised with other acrylate monomers such as butyl acrylate, or an acrylate polymer containing pendant reactive groups can be reacted with a silyl compound having co-reactive groups.

One preferred type of telechelic polymer backbone is an acrylate polymer backbone. The acrylate polymer is an addition polymerised polymer of acrylate and/or methacrylate ester monomers, which comprise at least 50% by weight of the monomer units in the acrylate polymer. Examples of acrylate ester monomers are n-butyl, isobutyl, n-propyl, ethyl, methyl, n-hexyl, n-octyl and 2-ethylhexyl acrylates. Examples of methacrylate ester monomers are n-butyl, isobutyl, methyl, n-hexyl, n-octyl, 2-ethylhexyl and lauryl methacrylates. The acrylate polymer preferably has a glass transition temperature $(T_g)$ below ambient temperature; acrylate polymers are generally preferred over methacrylates since they form lower $T_g$ polymers. Polybutyl acrylate is particularly preferred. The acrylate polymer can contain lesser amounts of other monomers such as styrene, acrylonitrile or acrylamide. The acrylate(s) can be polymerized by various methods such as conventional radical polymerization, or living radical polymerization such as atom transfer radical polymerization, reversible addition—fragmentation chain transfer polymerization, or anionic polymerization including living anionic polymerisation.

Other suitable types of organic polymer having hydrolysable silyl groups include silyl modified polyisobutylene, silyl modified polyurethanes and silyl modified polyethers, which are all available commercially in the form of telechelic polymers. Silyl modified polyisobutylene can for example contain curable silyl groups derived from a silyl-substituted alkyl acrylate or methacrylate monomer such as a dialkoxyalkylsilylpropyl methacrylate or trialkoxysilylpropyl methacrylate, which can be reacted with a polyisobutylene prepared by living anionic polymerisation, atom transfer radical polymerization or chain transfer polymerization. Silyl modified polyurethanes or polyethers can for example be prepared by the reaction of polyurethanes or polyethers having terminal ethylenically unsaturated groups with a silyl monomer containing hydrolysable groups and a Si—H group, for example a dialkoxyalkylsilicon hydride or trialkoxysilicon hydride. The polyurethane or polyether having terminal ethylenically unsaturated groups can be prepared by reacting a hydroxyl-terminated polyurethane or polyether with an ethylenically unsaturated compound containing a group reactive with hydroxyl, for example an epoxide group.

Any suitable cross-linker (b) may be used in the composition in accordance with the present invention, when required. In the case where the reactable groups in organopolysiloxane (a) are condensable groups the cross linker (b) contains at least two and preferably at least 3 silanol groups or silicon bonded hydrolysable groups. In such a case it is preferred for the cross-linker to be a silane or short chain organopolysiloxane (e.g. having a polymer backbone in accordance with formula 3 above, in which t is from 2 to about 100). The hydrolysable groups in the silane or short chain organopolysiloxane cross-linker may comprise acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

When the reactable groups in (a) are condensable groups and the cross linker (b) is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted with halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl or ethyl.

Silanes and siloxanes which can be used as cross linkers for polymers (a) containing condensable groups include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methyl-ethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

Further alternative cross-linkers include Alkylalkenylbis (N-alkylacetamido) silanes such as methylvinyldi-(N-methylacetamido)silane, and methylvinyldi-(N-ethylacetamido)silane; dialkylbis(N-arylacetamido) silanes such as dimethyldi-(N-methylacetamido)silane; and dimethyldi-(N-ethylacetamido)silane; Alkylalkenylbis(N-arylacetamido) silanes such as methylvinyldi(N-phenylacetamido)silane and dialkylbis(N-arylacetamido) silanes such as dimethyldi-(N-phenylacetamido)silane. The cross-linker used may also comprise any combination of two or more of the above.

The amount of cross linker (b) present in the composition when the reactable groups in (a) are condensable groups will depend upon the particular nature of the cross linker and in particular, the molecular weight of the molecule selected. The compositions suitably contain cross linker in at least a stoichiometric amount as compared to the polymeric material described above. Compositions may contain, for example, from 2-30% w/w of cross linker, but generally from 2 to 10% w/w. Acetoxy cross linkers may typically be present in amounts of from 3 to 8% w/w preferably 4 to 6% w/w whilst oximino cross-linkers, which have generally higher molecular weights will typically comprise from 3-8% w/w.

When the reactable groups in (a) are unsaturated groups which readily undergo addition reactions with Si—H groups, the cross-linker (b) in accordance with the composition of the present invention preferably comprises a silane or siloxane comprising at least two Si—H groups. Most preferably in this instance Component (b) is an organohydrogensiloxane having an average of greater than two silicon bonded hydrogen atoms per molecule and a viscosity of up to about 10 Pa·s at 25° C. The organohydrogensiloxane which functions as a cross-linker contains an average of at least two silicon-bonded hydrogen atoms per molecule, and no more than one silicon-bonded hydrogen atom per silicon atom, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cylcoalkyls such as cyclohexyl; and aryls such as phenyl and tolyl. Such materials are well known in the art. The molecular structure of the organohydrogensiloxane may be linear, branched, cyclic, or a network-form or a mixture thereof. There are no particular restrictions on the molecular weight of the organohydrogensiloxane, however it is preferable that the viscosity at 25° C. be 3 to 10,000 mPa·s. Furthermore, the amount of component (b) that is added to the composition has a value such that the ratio of the number of moles of hydrogen atoms bonded to silicon atoms to the number of moles of alkenyl groups bonded to silicon atoms is in the range of 0.5:1 to 20:1, and preferably in the range of 1:1 to 5:1. If this molar ratio is less than 0.5, curing of the present composition becomes insufficient, while if this molar ratio exceeds 20 hydrogen gas is evolved resulting in unwanted foaming.

The silicon-bonded organic groups present in the organohydrogensiloxane can include substituted and unsubstituted alkyl groups of 1-4 carbon atoms that are otherwise free of ethylenic or acetylenic unsaturation.

When the reactable groups in (a) are Si—H which readily undergo addition reactions with unsaturated groups the cross-linker (b) comprises a silane or siloxane comprising at least two unsaturated groups. Preferably in this case cross-linker (b) is a short chain siloxane (containing between 2 and 20 silicon atoms) having at least three alkenyl groups. Preferably the alkenyl groups contain between 2 and 10 carbon atoms such as for example vinyl, propenyl, and/or hexenyl groups, vinyl groups being particularly preferred.

Each extender in accordance with the present invention comprises one or more suitable alicyclic esters having at least two ester groups per molecule. It is surprising that these compounds have been identified as suitable extenders for non-polar silicone polymers as they are known to be compatible with polar organic polymers such a polyvinyl chloride. Preferably each extender is a liquid at room temperature (25° C.) and has a boiling point when measured at room temperature and pressure of greater than 180° C., more preferably a boiling point of greater than 230° C. In the case of mixtures having a boiling point range the starting boiling point must be greater than 180° C. and more preferably greater than 230° C., irrespective of the final boiling point of the range. It is essential to have such minimum boiling points or boiling point ranges to ensure that the extender does not evaporate at usual working temperatures of the sealant in which it is to be added.

Each ester group attached to the cyclic structure of the extender may be the same or different and may be linear or contain a degree of branching. Each ester group may contain one or more unsaturated groups but is preferably a carboxylic acid ester containing from 2 to 30 carbon atoms. Preferably each ester group attached to the cyclic structure is the result of a reaction between a carboxylic acid having from 1 to 20 carbon atoms and an alcohol having from 1 to 20 carbon atoms with the proviso that the maximum total number of carbon groups in the ester is 30 (i.e. the cumulative total of carbon atoms in the acid and alcohol.

The cyclic starting product for esterification may comprise an alicyclic carboxylic acid having at least two carboxylic acid groups (which may be the same or different) per molecule and such an acid is reacted with an aliphatic alcohol or mixture of aliphatic alcohols.

Alternatively the cyclic starting product for esterification may comprise an alicyclic alcohol having at least two alcohol groups (which may be the same or different) per molecule and such an alcohol is reacted with an aliphatic carboxylic acid or mixture of aliphatic carboxylic acids.

The cyclic group contained in the extender may comprise any suitable alicyclic ring structure and if appropriate may comprise a hetero atom in the ring although this is not preferred. Particularly preferred alicyclic groups are cyclohexane and cyclopentane groups. When the alicyclic group is a cyclohexane group each cyclohexane preferably has from 2 to 6 ester groups per molecule (i.e. up to one ester group per carbon atom in the ring), however from 2 to 4 ester groups per molecule, more preferably two or three ester groups per molecule is preferred. Such esters may be positioned on any suitable carbon in the cyclohexane ring. Suitable examples of extenders in accordance with the present invention include 1,2-cyclohexane dicarboxylic acid dialkylesters, 1,3-cyclohexane dicarboxylic acid dialkylesters 1,4-cyclohexane dicarboxylic acid dialkylesters, 1,2,3-cyclohexane tricarboxylic acid trialkylesters, 1,2,4-cyclohexane tricarboxylic acid trialkylesters and 2,3,4-cyclohexane tricarboxylic acid trialkylesters, 1,2-cyclohexane dialkylcarboxylic acid dialkylesters, 1,3-cyclohexane dialkylcarboxylic acid dialkylesters 1,4-cyclohexane dialkylcarboxylic acid dialkylesters, 1,2,3-cyclohexane trialkylcarboxylic acid trialkylesters, 1,2,4-cyclohexane trialkylcarboxylic acid trialkylesters and 2,3,4-cyclohexane trialkylcarboxylic acid trialkylesters. Specific examples which may be utilised as the extender of the present invention comprises cyclohexane dicarboxylic acid di-isononyl ester cyclohexane dicarboxylic acid di-isononyl ester cyclohexane dicarboxylic acid di-isooctyl ester, cyclohexane dicarboxylic acid di-isononyl ester cyclohexane, dicarboxylic acid di-isodecyl ester and cyclohexane dicarboxylic acid di-dodecadecyl ester.

Preferably the aforementioned alicyclic esters having at least two ester groups per molecule extender are the only extenders in the composition. Furthermore the alicyclic esters can contain more than one cyclic group, e.g. decalindiester.

The amount of extender and/or plasticiser which may be included in the composition in accordance with the present invention will depend upon factors such as the purpose to which the composition is to be put, the molecular weight of the extender(s) concerned etc. In general however, the higher the molecular weight of the extender(s), the less will be tolerated in the composition but such high molecular weight extenders have the added advantage of lower volatility thus enabling the sealant composition to meet ISO 10563 requirements. Typical compositions will comprise from 5-50% w/w of extender(s).

The extender in accordance with the present invention may be blended with the other ingredients of the composition in accordance with the present invention as required or may be introduced into the monomer/oligomer mixture prior to or during the polymerisation of polymer component (a).

Generally the extender(s) used in accordance with the present invention are not intended to chemical bond to the monomer/oligomer starting materials or intermediate or final polymerisation product. However, some chemical bonding and/or reversible interactions between the polymer reaction products and extender(s) may occur. Preferably, chemical bonding, which takes place between the polymer and the extender(s) occurs with substituents along the backbone of the polymer rather than with polymer end groups so as to form a cross-linking network between polymer and extender thereby providing a polymer product which is less likely to result in extender loss and/or shrinkage when used in for example a sealant composition. For the sake of clarification with respect to this paragraph the term "chemically bond" is intended to mean the formation of covalent or the like bonds and not mere chemical interactions such as hydrogen bonding or the like. It is preferred that the extender does not react or interact in any way with the cross-linker.

When the reactable groups in (a) are condensable groups, the composition further comprises a condensation catalyst (d). This increases the speed at which the composition cures. The condensation catalyst (d) chosen for inclusion in a particular silicone sealant composition depends upon the speed of cure required. The amount of catalyst used depends on the cure system being used but typically is from 0.01 to 3% by weight of the total composition Any suitable condensation catalyst (d) may be utilised to cure the composition these include condensation catalysts including tin, lead, antimony, iron, cadmium, barium, manganese, zinc, chromium, cobalt, nickel, aluminium, gallium or germanium and zirconium. Examples include organic tin metal catalysts such as triethyltin tartrate, tin octoate, tin oleate, tin naphthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate of which dibutyltin dilaurate, dibutyltin diacetate are particularly preferred. Other examples include 2-ethylhexoates of iron, cobalt, manganese, lead and zinc may alternatively be used but titanate and/or zirconate based catalysts are preferred.

Silicone sealant compositions which contain oximosilanes or acetoxysilanes as cross-linkers (b) in condensation cure compositions, generally use a tin catalyst for curing, especially diorganotin dicarboxylate compounds such as dibutyltin dilaurate, dibutyltin diacetate, dimethyltin bisneodecanoate.

For compositions which include alkoxysilane cross linker compounds, the preferred curing catalysts are those where M is titanium or zirconium, i.e. where the catalyst comprises titanate or zirconate compounds. Titanate compounds are particularly preferred. Such titanates may comprise a compound according to the general formula Ti[OR]$_4$ where each R may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R include but are not restricted to methyl, ethyl, propyl, isopropyl, butyl, tertiary butyl and a branched secondary alkyl group such as 2,4-dimethyl-3-pentyl. Preferably, when each R is the same, R is an unbranched secondary alkyl groups, branched secondary alkyl group or a tertiary alkyl group, in particular, tertiary butyl such as tetrabutyltitanate, tetraisopropyltitanate.

For the avoidance of doubt an unbranched secondary alkyl group is intended to mean a linear organic chain which does not have a subordinate chain containing one or more carbon atoms, i.e. an isopropyl group, whilst a branched secondary alkyl group has a subordinate chain of one or more carbon atoms such as 2,4-dimethyl-3-pentyl.

Any suitable chelated titanates or zirconates may be utilised. Preferably the chelate group used is a monoketoester such as acetylacetonate and alkylacetoacetonate giving chelated titanates such as, for example diisopropyl bis(acetylacetonyl)titanate, diisopropyl bis(ethylacetoacetonyl)titanate, diisopropoxytitanium Bis(Ethylacetoacetate) and the like. Examples of suitable catalysts are additionally described in EP1254192 and WO200149774 which are incorporated herein by reference.

Typically the condensation catalyst, component (d), will be present in an amount of from 0.3 to 6 parts by weight per 100 parts by weight of component (a). Component (d) may be present in an amount of greater than 6 parts where required, such as by weight in cases where chelating agents are used.

When the reactable groups in (a) are unsaturated groups or Si—H groups component (d), will be a hydrosilylation catalyst. When the addition reaction chosen is a hydrosilylation reaction, any suitable hydrosilylation catalyst may be utilised. Such hydrosilylation catalysts are illustrated by any metal-containing catalyst which facilitates the reaction of silicon-bonded hydrogen atoms of the SiH terminated organopolysiloxane with the unsaturated hydrocarbon group on the polyoxyethylene. The metals are illustrated by ruthenium, rhodium, palladium, osmium, iridium, or platinum.

Hydrosilylation catalysts are illustrated by the following; chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum supported on metal oxide carriers such as $Pt(Al_2O_3)$, platinum black, platinum acetylacetonate, platinum(divinyltetramethyldisiloxane), platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

Ruthenium catalysts such as $RhCl_3(Bu_2S)_3$ and ruthenium carbonyl compounds such as ruthenium 1,1,1-trifluoroacetylacetonate, ruthenium acetylacetonate and triruthinium dodecacarbonyl or a ruthenium 1,3-ketoenolate may alternatively be used.

Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4_3[(R^3)_2S]_3$, $(R^2_3P)_2Rh(CO)X^4$, $(R^2_3P)_2Rh(CO)H$, $Rh_2X^4_2Y^4_4$, $H_aRh_bolefin_cCl_d$, $Rh(O(CO)R^3)_{3-n}(OH)_n$ where $X^4$ is hydrogen, chlorine, bromine or iodine, $Y^4$ is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^2)(En)_2]_2$, or $(Ir(Z^2)(Dien)]_2$, where $Z^2$ is chlorine, bromine, iodine, or alkoxy, En is an olefin and Dien is cyclooctadiene may also be used.

The hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

Optionally when component (d) is a hydrosilylation catalyst particularly a platinum based catalyst a suitable hydrosilylation catalyst inhibitor may be required. Any suitable platinum group type inhibitor may be used. One useful type of platinum catalyst inhibitor is described in U.S. Pat. No. 3,445,420, which is hereby incorporated by reference to show certain acetylenic inhibitors and their use. A preferred class of acetylenic inhibitors are the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by reference to show certain olefinic siloxanes, their preparation and their use as platinum catalyst inhibitors. A third type of platinum catalyst inhibitor includes polymethylvinylcyclosiloxanes having three to six methylvinylsiloxane units per molecule.

Compositions containing these catalysts typically require heating at temperatures of 70° C. or above to cure at a practical rate, particularly if an inhibitor is used. Room temperature cure is typically accomplished with such systems by use of a two-part system in which the cross-linker and inhibitor are in one of the two parts and the platinum is in the other part. The amount of platinum is increased to allow for curing at room temperature. The optimum concentration of platinum catalyst inhibitor is that which will provide the desired storage stability or pot life at ambient temperature without excessively prolonging the time interval required to cure the present compositions at elevated temperatures. This amount will vary widely and will depend upon the particular inhibitor that is used, the nature and concentration of the platinum-containing catalyst (d) and the nature of the cross-linker (b). Inhibitor concentrations as low as one mole of inhibitor per mole of platinum will in some instances yield a desirable level of storage stability and a sufficiently short curing period at temperatures above about 70° C. In other cases, inhibitor concentrations of up to 10, 50, 100, 500 or more moles per mole of platinum may be needed. The optimum concentration for a particular inhibitor in a given composition can be determined by routine experimentation.

Organic peroxides may alternatively be used as catalyst (d) which may be utilised in the absence of a cross-linker, particularly when component (a) comprises trialkylsilyl terminal groups and/or unsaturated groups. Suitable organic peroxides include dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethyl-hexane, tertiary-butyl-trimethyl peroxide, tertiary-butyl-tertiary-butyl-tertiary-triphenyl peroxide, 1,1-bis(t-butylperoxy)-3,3,5-trimethylcyclohexane, and t-butyl perbenzoate. The most suitable peroxide based curing agents are benzoyl peroxide, 2,4-dichlorobenzoyl peroxide, di-t-butyl peroxide, and dicumyl peroxide. Such organic peroxides are used at up to 10 parts per 100 parts of the combination of polymer, filler and optional additives. Preferably between 0.2 and 2 parts of peroxide are used.

Compositions of this invention may contain, as optional constituents, other ingredients which are conventional to the formulation of silicone rubber sealants and the like. For example, the compositions may contain one or more finely divided, reinforcing fillers (e) such as high surface area fumed and precipitated silicas and to a degree calcium carbonate or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes, such as hexaalkyl disilazane or short chain siloxane diols to render the filler(s) hydrophobic and therefore easier to handle and obtain a homogeneous mixture with the other sealant components The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

The proportion of such fillers when employed will depend on the properties desired in the elastomer-forming composition and the cured elastomer. Usually the filler content of the composition will reside within the range from about 5 to about 500 parts by weight per 100 parts by weight of the polymer excluding the extender portion.

The composition in accordance with the present invention provides the user with formulations suitable for applications including, sealants formulations and silicone rubber formulations.

Other ingredients which may be included in the compositions in accordance with the present invention include but are not restricted to co-catalysts for accelerating the cure of the composition such as metal salts of carboxylic acids and amines; rheological modifiers; Adhesion promoters, pigments, Heat stabilizers, Flame retardants, UV stabilizers, Chain extenders, cure modifiers, electrically and/or heat conductive fillers, Fungicides and/or biocides and the like (which may be suitably present in an amount of from 0 to 0.3% by weight), water scavengers, (typically the same compounds as those used as cross-linkers or silazanes). It will be appreciated that some of the additives are included in more than one list of additives. Such additives would then have the ability to function in all the different ways referred to.

The rheological additives include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols. For some systems rheological additives, particularly copolymers of ethylene oxide (EO) and propylene oxide (PO), and silicone polyether copolymers may enhance the adhesion of the sealant to substrates, particularly plastic substrates.

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercaptoalkylalkoxy silanes and γ-aminopropyl triethoxysilane, reaction products of ethylenediamine with silylacrylates. Isocyanurates containing silicon groups such as 1,3,5-tris (trialkoxysilylalkyl) isocyanurates may additionally be used. Further suitable adhesion promoters are reaction products of epoxyalkylalkoxy silanes such as 3-glycidoxypropyltri-methoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

Heat stabilizers may include Iron oxides and carbon blacks, Iron carboxylate salts, cerium hydrate, barium zirconate, cerium and zirconium octoates, and porphyrins.

Flame retardants may include for example, carbon black, hydrated aluminium hydroxide, and silicates such as wollastonite, platinum and platinum compounds.

Chain extenders may include difunctional silanes which extend the length of the polysiloxane polymer chains before cross linking occurs and, thereby, reduce the modulus of elongation of the cured elastomer. Chain extenders and cross linkers compete in their reactions with the functional polymer ends; in order to achieve noticeable chain extension, the difunctional silane must have substantially higher reactivity than the typical trifunctional cross-linker. Suitable chain extenders for condensation cure systems are, for example, Diacetamidosilanes such as dialkyldiacetamidosilanes or alkenylalkyldiacetamidosilanes, particularly methylvinyldi (N-methylacetamido)silane, or dimethyldi(N-methylacetamido)silane diacetoxysilanes, such as dialkyldiacetoxysilanes and alkylalkenyldiacetoxysilanes diaminosilanes, such as dialkyldiaminosilanes or alkylalkenyldiaminosilanes particularly those where each amino group has one Si—N bond and two N—C bonds; dialkoxysilanes such as dimethoxydimethylsilane and diethoxydimethylsilane a polydialkylsiloxane having a degree of polymerisation of from 2 to 25 and having at least two acetamido or acetoxy or amino or alkoxy or amido or ketoximo substituents per molecule, wherein each alkyl group independently comprises from 1 to 6 carbon atoms; hexaorganocyclotrisilazanes, octoorganocyclotetrasilazanes, diamidosilanes such as dialkyldiamidosilanes or alkylalkenyldiamidosilanes diketoximinosilanes such as dialkylkdiketoximinosilanes and alkylalkenyldiketoximinosilanes α-aminoalkyldialkoxyalkylsilanes wherein the alkyl and alkoxy groups contain from 1 to 5 carbon atoms, such as α-aminomethyldialkoxymethylsilanes particularly preferred are those where aminomethyl group is an N,N-dialkylaminomethyl group.

Specific examples of chain extenders include alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, and alkenylalkyldihydroxysilanes such as vinyl methyl dihydroxysilane, vinyl ethyldihydroxysilane, vinyl methyldihydroxysilane, vinylethyldihydroxysilane methylphenyl-dimethoxysilane, di-butoxy diacetoxysilane, Alkylalkenylbis(N-alkylacetamido) silanes such as methylvinyldi-(N-methylacetamido)silane and methylvinyldi-(N-ethylacetamido)silane; dialkylbis(N-arylacetamido) silanes such as dimethyldi-(N-methylacetamido)silane; and dimethyldi-(N-ethylacetamido)silane; Alkylalkenylbis(N-arylacetamido) silanes such as methylvinyldi(N-phenylacetamido) silane and dialkylbis(N-arylacetamido) silanes such as dimethyldi-(N-phenylacetamido)silane, methylvinyl bis(N-methylacetamido)silane, methylhydrogendiacetoxysilane, dimethylbis(N-diethylaminoxy)silane and dimethylbis(sec.-butylamino)silane. The chain extender used may also comprise any combination of two or more of the above.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Any suitable Fungicides and biocides may be utilised, these include N-substituted benzimidazole carbamate, benzimidazolylcarbamate such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]} carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]} carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]} carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]} carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyloxy)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]} carbamate. 10,10'-oxybisphenoxarsine (trade name: Vinyzene, OBPA), di-iodomethyl-para-tolylsulfone, benzothiophene-2-cyclohexylcarboxamide-S,S-dioxide, N-(fluordichloridemethylthio)phthalimide (trade names: Fluor-Folper, Preventol A3). Methyl-benzimideazol-2-ylcarbamate (trade names: Carbendazim, Preventol BCM), Zinc-bis(2-pyridylthio-1-oxide) (zinc pyrithion) 2-(4-thiazolyl)-benzimidazol, N-phenyl-iodpropargylcarbamate, N-octyl-4-isothiazolin-3-on, 4,5-dichloride-2-n-octyl-4-isothiazolin-3-on, N-butyl-1,2-benzisothiazolin-3-on and/or Triazolyl-compounds, such as tebuconazol in combination with zeolites containing silver.

Condensation cure compositions in accordance with the present invention are preferably room temperature vulcanisable compositions in that they cure at room temperature without heating. Whilst hydrosilylation cured compositions in accordance with the present invention may commence at room temperature but heating is preferred.

Condensation cure compositions can be prepared by mixing the ingredients employing any suitable mixing equipment. Other components may be added as necessary. For example preferred one part, moisture curable compositions may be made by preparing polymer (a) in the presence of extender (c) mixing together the resulting extended polysiloxane having hydroxyl or hydrolysable groups and or filler used, and mixing this with a pre-mix of the cross linker and catalyst. UV-stabilisers pigments and other additives may be added to the mixture at any desired stage. Alternatively a one part, moisture curable compositions may be made by blending together a pre-prepared polysiloxane having hydroxyl or hydrolysable groups (a), and extender and any filler used, and mixing this with a pre-mix of the cross linker and catalyst. UV-stabilisers pigments and other additives may be added to the mixture at any desired stage.

After preparation, as described above, condensation curable compositions may be stored under substantially anhydrous conditions, for example in sealed containers, until required for use.

Condensation curable compositions according to this aspect of the invention are stable in storage but cure on exposure to atmospheric moisture and may be employed in a variety of applications, for example as coating, caulking and encapsulating materials. They are, however, particularly suitable for sealing joints, cavities and other spaces in articles and structures which are subject to relative movement. They are thus particularly suitable as glazing sealants and for sealing building structures where the visual appearance of the sealant is important.

Thus in a further aspect, the invention provides a method of sealing a space between two units, said method comprising applying a composition as described above and causing or allowing the composition to cure. Suitable units include glazing structures or building units as described above.

Many sealant compositions in accordance with the present invention are often supplied for use in cartridge packs made from a suitable (typically) rigid plastic material such as polyethylene. One advantage of using high molecular weight extenders in accordance with the present invention is that for polyethylene cartridges reduced swelling of the polyethylene used is observed. It was determined by the inventors that the increase in swelling observed with extended sealant formulations in polyethylene cartridges correlated with the molecular weight of the extender in the sealant composition.

Other optional ingredients which may be incorporated in organic peroxide curable and/or hydrosilylation curable silicone rubber compositions in accordance with the present invention of a high consistency silicone rubber include handling agents, peroxide cure co-agents, acid acceptors, and UV stabilisers.

Handling agents are used to modify the uncured properties of the silicone rubber such as green strength or processability sold under a variety of trade names such as SILASTIC® HA-1, HA-2 and HA-3 sold by Dow Corning corporation).

Peroxide cure co-agents are used to modify the properties, such as tensile strength, elongation, hardness, compression set, rebound, adhesion and dynamic flex, of the cured rubber. These may include di- or tri-functional acrylates such as Trimethylolpropane Triacrylate and Ethylene Glycol Dimethacrylate; Triallyl Isocyanurate, Triallyl Cyanurate, Polybutadiene oligomers and the like. Silyl-hydride functional siloxanes may also be used as co-agents to modify the peroxide catalysed cure of siloxane rubbers.

The acid acceptors may include Magnesium oxide, calcium carbonate, Zinc oxide and the like.

The ceramifying agents can also be called ash stabilisers and include silicates such as wollastonite.

Silicone rubber compositions in accordance with this embodiment may be made by any suitable route, for example one preferred route is to first make a silicone rubber base by heating a mixture of fumed silica, a treating agent for the silica, and the diluted organopolysiloxane containing polymer of the present invention. The polymer may have been prepared in the presence of the extender or the extender may be blended in to a pre-prepared polymer mixture. The silicone rubber base is removed from the first mixer and transferred to a second mixer where generally about 150 parts by weight of a non-reinforcing or extending filler such as ground quartz is added per 100 parts by weight of the silicone rubber base. Other additives are typically fed to the second mixer such as curing agents, pigments and colouring agents, heat stabilizers, anti-adhesive agents, plasticizers, and adhesion promoters. In a second preferred route the diluted organopolysiloxane containing polymer of the present invention and any desired filler plus any desired treating agent are fed into a reactor and mixed, further additives as described above including cure agents are then fed into the same reactor and further mixed.

In accordance with a further embodiment of the invention there is provided the use of one or more esters as hereinbefore described as extenders in organosiloxane based compositions, particularly composition for sealant type applications and silicone rubber based applications.

For such use the extender may be introduced into the composition in any suitable manner. Particularly preferred alternatives are by blending with other pre-formed ingredients or by being added to the polymer component prior to or during its manufacture and prior to the introduction of any other ingredients.

The invention will now be described by way of Example in which all viscosities are values at 25° C. unless indicated otherwise. All viscosities of starting materials are given as pre-measured values provided by suppliers and viscosity measurements taken during experiments were measured using a Brookfield® HB DV-II+PRO with a cone plate spindle at a speed of 5 rpm.

The polymer used was a dihydroxy terminated polydimethylsiloxane with a viscosity of 50000 mPas. The Crosslinker was a mixture of approximately equal amounts of methyltriacetoxysilane and ethyltriacetoxysilane. The filler was a fumed silica with a BET surface area of approx. 150 m²/g (LM 150™ sold by the Cabot Corporation). The Catalyst was dibutyltin diacetate.

The extender in example 1 is a 1,2-cyclohexane dicarboxylic acid di-isononyl ester (Hexamoll™ DINCH sold by BASF). The extender in comparative example 1 is a fully hydrogenated mineral oil (Hydroseal™ G400 sold by Total) which is marketed as an extender for sealants which meet the ISO 11600 25 LM standard.

The compositions of Example 1 and comparative example 1 were prepared by mixing the ingredients listed (in the amounts indicated in Table 1) in a Hausschild laboratory mixer (dental mixer) and filling the resulting mixed composition into cartridges.

The compositions were stored for 24 hours in the cartridges at ambient temperature and sheets for mechanical properties were prepared and then cured for one week at room temperature (RT) and 50% relative humidity (RH) (referred to as 1 w RT in Table 1 below). The tensile Strength tests (breaking stress) in MPa were performed in accordance with ASTM D412-98a using a 2 mm specimen sheet. 'Modulus 100%' is the nominal stress (or apparent stress, in MPa) at 100% elongation. Elongation is given in % according to ASTM D412-98a for 2 mm sheets. The Hardness was Shore A hardness measured according to ASTM D2240-02b.

The results and formulations are shown in table 1

TABLE 1

| Formulation | Example 1 | Comparative Example 1 |
| --- | --- | --- |
| Polymer | 77.48% | 77.48% |
| Organic extender | 10% | 10% |
| Crosslinker | 4.5% | 4.5% |
| Catalyst | 0.02% | 0.02% |
| Fumed silica | 8% | 8% |
| Properties (1 w RT) | | |
| Hardness (Shore A) | 15 | 22 |
| Tensile (MPa) | 1.09 | 1.16 |
| Elongation at break (%) | 182 | 190 |
| 100% Modulus (Mpa) | 0.50 | 0.63 |

The table shows that a silicone sealant containing 1,2 cyclohexane dicarboxylic acid di-isononyl ester as an organic extender has good mechanical properties. The cured sealant shows no signs of surface bleeding of the extender as often observed with extenders lacking sufficient compatibility with silicones.

Sheets of the cured sealants (same as used for testing mechanical properties) were stored in a ventilated oven at 70° C. and their weight loss was measured. The results are shown in table 2.

TABLE 2

| Time | Example 1 | Comparative Example 1 |
| --- | --- | --- |
| 1 week RT | 3.82% | 4.25% |
| +1 day 70° C. | 4.33%% | 6.90% |
| +2 days 70° C. | 4.44% | 8.33% |
| +3 days 70° C. | 4.51% | 10.39% |
| +6 days 70° C. | 4.53% | 12.01% |

The results show that a silicone sealant containing 1,2 cyclohexane dicarboxylic acid di-isononyl ester has a weight loss, and therefore shrinkage in the application, lower than the mineral oil extender of the high boiling type.

EXAMPLE 2

The compatibility of 1,2 cyclohexane dicarboxylic acid di-isononyl ester with silicones was compared to the compatibility of phthalates in silicones by means of a swelling test, in which identical cured sheets of Dow Corning® 781, a commercial silicone sealant sold by Dow Corning Corporation containing no organic fluid was immersed in different extenders at room temperature for a period of 1 week. The weight gain of the respective sheets are indicated in Table 3.

TABLE 3

| Extender | % weight gain |
| --- | --- |
| 1,2-cyclohexane dicarboxylic acid di-isononyl ester | 13.6 |
| di-isononyl phthalate | 3.6 |
| di-undecyl phthalate | 1.1 |

The results show that the extender in accordance with the present invention had a significantly better compatibility with the sheet of silicone sealant as compared with the sheets treated with the phthalates. This was particularly surprising as the different extenders have a similar number of carbon atoms. The low swelling results in relation to the phthalates teaches that they can not be used in significant amounts in sealant elastomers without avoiding exudation thereof from the sealant. In contrast, surprisingly the cyclohexane derivative has sufficient compatibility to make it useful as an extender in silicone elastomers.

The poor compatibility of phthalates with silicone sealant formulations is confirmed using the sealant components as described in Example 1 (other than the polymer), in the amounts depicted in Table 4. In these comparative examples the polymer used with a dihydroxy terminated polydimethylsiloxane with a viscosity of 80000 mPas. The extenders were replaced with the phthalates indicated below.

TABLE 4

| Formulation | Comparative Example 2 | Comparative Example 3 |
| --- | --- | --- |
| Polymer | 82.48% | 77.48% |
| di-isononyl phthalate | 5% | 10% |
| Crosslinker | 4.5% | 4.5% |
| Catalyst | 0.02% | 0.02% |
| Fumed silica | 8% | 8% |

The formulations of both comparative products were opaque due to the incompatibility of the phthalate with the silicone. It was noticed that the phthalates bled out of the compositions during cure at room temperature. This makes them unsuited for most typically silicone elastomer applications.

The invention claimed is:

1. A one or two part organopolysiloxane composition capable of cure to an elastomeric body, the composition comprising:
    a) a polymer having a polymer backbone selected from an organopolysiloxane backbone and a telechelic backbone, which polymer has not less than two reactable silicon-bonded groups selected from unsaturated groups, and condensable groups;
    b) if required, a siloxane and/or silane cross-linker having at least two groups per molecule which are reactable with the reactable groups in (a);
    c) 5 to 50% by weight of the composition of an extender;
    d) a suitable cure catalyst; and optionally
    e) one or more fillers;
        wherein the extender is selected from an alicyclic ester having at least two ester groups, and a boiling point of at least 180° C. or a mixture thereof having a boiling point range commencing at 180° C. or above; each ester group being the same or different and comprising from 2 to 30 carbon atoms, and wherein the unsaturated groups are cured by a catalyst consisting of an organic peroxide.

2. A composition in accordance with claim 1 wherein the extender is a cyclohexane compound comprising from 2 to 4 ester groups.

3. A composition in accordance with claim 1 wherein the extender is selected from the group of 1,2-cyclohexane dicarboxylic acid dialkylesters, 1,3-cyclohexane dicarboxylic acid dialkylesters, 1,4-cyclohexane dicarboxylic acid dialkylesters, 1,2,3-cyclohexane tricarboxylic acid trialkylesters, 1,2,4-cyclohexane tricarboxylic acid trialkylesters and 2,3,4-cyclohexane tricarboxylic acid trialkylesters, 1,2-cyclohexane dialkylcarboxylic acid dialkylesters, 1,3-cyclohexane dialkylcarboxylic acid dialkylesters, 1,4-cyclohexane dialkylcarboxylic acid dialkylesters, 1,2,3-cyclohexane trialkylcarboxylic acid trialkylesters, 1,2,4-cyclohexane trialkylcarboxylic acid trialkylesters and 2,3,4-cyclohexane trialkylcarboxylic acid trialkylesters.

4. A composition in accordance with claim 1 wherein the extender is selected from the group of cyclohexane dicarboxylic acid di-isooctyl ester, cyclohexane dicarboxylic acid di-isononyl ester cyclohexane, dicarboxylic acid di-isodecyl ester, and cyclohexane dicarboxylic acid di-dodecyl ester.

5. A composition in accordance with claim 1 wherein the organopolysiloxane containing polymer has not less than two reactable silicon-bonded, condensable groups.

6. A composition in accordance with claim 5 wherein the cross-linking agent is selected from one or more of the following alkyltrialkoxysilanes, alkenyltrialkoxy silanes, alkenyl alkyl dialkoxysilanes, and alkenyl alkyl dialkoxysilanes.

7. A composition in accordance with claim 5 wherein the catalyst is selected from the group of a titanate, a zirconate, a chelated titanate, a chelated zirconate, or an organotin compound.

8. A composition in accordance with claim 1 wherein the organopolysiloxane containing polymer has not less than two reactable silicon-bonded, unsaturated groups selected from alkenyl groups, alkynyl groups, acrylate groups, and/or alkylacrylate groups.

9. A composition in accordance with claim 1 further comprising a filler selected from one or more of high surface area fumed and precipitated silicas, calcium carbonate, crushed quartz, diatomaceous earths, barium sulphate, iron oxide, titanium dioxide and carbon black, talc, wollastonite, pyrophyllite, aluminite, calcium sulphate (anhydrite), gypsum, calcium sulphate, magnesium carbonate, clays such as kaolin, aluminium trihydroxide, magnesium hydroxide (brucite), graphite, copper carbonate, nickel carbonate, barium carbonate, and/or strontium carbonate.

10. A composition in accordance with claim 1 further comprising one or more of the following additives: rheological modifiers; adhesion promoters, pigments, Heat stabilizers, Flame retardants, UV stabilizers, Chain extenders, electrically and/or heat conductive fillers, Fungicides and/or biocides.

11. A method of sealing a space between two units, said method comprising applying a composition according to claim 5 to the space, and causing or allowing the composition to cure.

12. A sealant composition comprising the composition in accordance with claim 1.

13. A silicone rubber composition comprising the composition in accordance with claim 1.

14. A glazing structure or building unit which includes a sealant derived from a composition according to claim 1.

15. A multi-pack sealant composition according to claim 1 comprising a first pack comprising polymer (a) and filler (e) (when required) and a second pack comprising catalyst (d) and cross-linker (b) and wherein optional additives are in either or both said first and second packs.

16. A method of sealing a space between two units, said method comprising applying a composition in accordance with claim 1 and causing or allowing the composition to cure.

* * * * *